Figure 1:
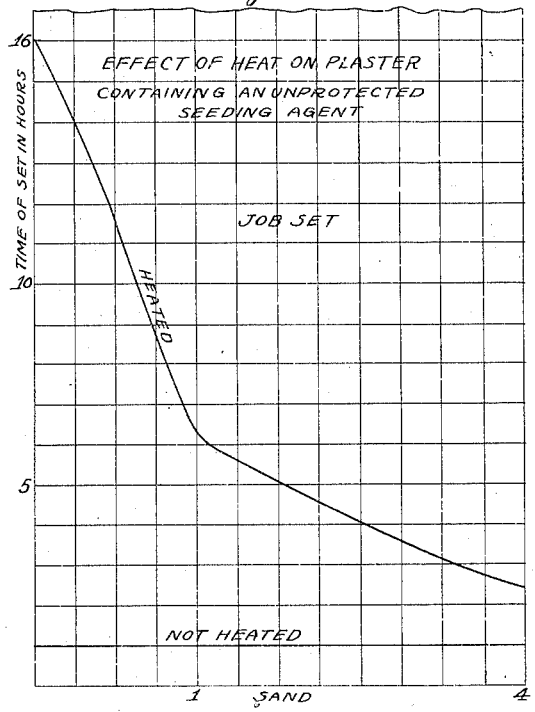

April 20, 1937.  G. D. KING  2,078,199

HEATPROOFED SET STABILIZED GYPSUM PLASTER

Filed Oct. 2, 1936

Inventor.
George D. King
By Jones, Addington, Ames & Seibold
Attys.

Patented Apr. 20, 1937

2,078,199

UNITED STATES PATENT OFFICE 2,078,199

HEATPROOFED SET-STABILIZED GYPSUM PLASTER

George D. King, Chicago, Ill., assignor to United States Gypsum Company, Chicago, Ill., a corporation of Illinois Application October 2, 1936, Serial No. 103,655

15 Claims. (Cl. 106—34)

The present invention relates to an improved process of stabilizing the setting time of calcium sulfate hemihydrate cements and plasters against the influence of adventitious admixtures of substances which may have either an accelerating or a retarding effect, as well as against the effect of temperatures above normal.

One of the primary objects of the present invention is to produce a calcium sulfate hemihydrate cement or plaster to which there have been added accelerating as well as retarding materials in such proportions that the subsequent adventitious admixture of accelerating or retarding influences will be without any material effect upon the setting time of the plaster, so that it may properly be called a "set-stabilized" plaster. In addition, the plaster is also substantially immune from the loss of its set-stability as a result of becoming heated above normal ambient temperatures. It is in this sense that the term "set-stabilized" will be used in the further description and claims of the present invention.

A further object of the invention is to admix calcium sulfate hemihydrate cement or plaster, such for example as calcined gypsum, with seed crystals of calcium sulfate dihydrate, which may be ground natural or raw gypsum, ground set plaster of Paris (calcium sulfate dihydrate), or chemically formed gypsum, and which material has been protected against loss of its water of crystallization by having admixed therewith, or being coated with, a calcination-retarding agent such for example as a soluble carbohydrate, generally exemplified by the broad class of sugars or polyhydric alcohols such as glycerol or polyglycols.

The main object to be attained by the present invention is to enable the production of a set-stabilized calcined gypsum plaster by means of ingredients which are readily available in the gypsum industry, and which, because of their low price, are particularly advantageous from a commercial standpoint.

It has already been proposed to produce set-stabilized gypsum plaster by mixing with the plaster, ground set plaster (calcium sulfate dihydrate) or to produce, in a mixture of calcined gypsum and water, seed crystals of calcium sulfate dihydrate by metathesis, as for example by the precipitation of calcium sulfate crystals from lime and aluminum sulfate, or alum, there also being present sufficient quantities of retarder to offset the accelerating effect of the added crystal-forming material.

Thus, for example, the use of calcium sulfate dihydrate seed crystals, which may be either the natural product or ground plaster, has already been proposed. In the case of the ground natural gypsum it was found, however, by the present inventor, that it was necessary, in order to obtain the proper results, that the natural gypsum be ground to a state of fineness so that a fair modicum of particles having a maximum diameter of about 25 microns or less be present. The use of such specially ground natural or raw gypsum (land plaster) is fully described and claimed in applicant's copending application Serial No. 103,654 filed October 2, 1936.

When using either ground set gypsum or ground natural gypsum or land plaster for set-stabilizing purposes, or even merely as an accelerating agent, it is necessary to mix this material with the calcined gypsum. If this is done when the material is cold—that is to say, when it is at normal room temperature, say from 50° to 90° F.—the results are satisfactory. If, however, the seed crystals of calcium sulfate dihydrate are added to the calcined gypsum while the latter is still warm, as for example when it comes from the calcining kettles or storage pits, at which time it is over 250° F., it becomes necessary to protect the seed crystals against loss of their water of crystallization. This practice of bagging the plaster while still hot is common manufacturing practice, to speed production and shipments. Also, if properly set-stabilized plaster containing seed crystals of calcium sulfate dihydrate is stored under conditions where the temperature exceeds 105° F., there is a slow but steady loss of water of crystallization, with the result that the greater part of the seed crystals is destroyed, with the formation of calcium sulfate hemihydrate which, being like the bulk of the material, then no longer has any seeding effect.

When producing set-stabilized plaster, there is used a considerable excess of seeding agent as well as of retarder, these two influences being so balanced against each other that the total effect results in a plaster the setting time of which will not be further accelerated by the accidental admixture therewith of set plaster or other set-accelerating job influences, nor will its setting time be further retarded by the accidental admixture of retarding substances. The general principles of set-stabilization have already been well established in this industry and hence require no further elucidation.

It will readily be understood by those skilled in this art that if the seeding portion of the set-stabilizing composition should lose its seeding properties, the plaster will then become over-retarded, with the result that it will have an inordinately long time of set, which is highly undesirable. The modern industry demands a plaster the setting time of which is definitely predetermined by the manufacturer, and which can be depended upon to retain this setting time irrespective of storage conditions and length of time, the use of dirty mixing tools, or general improper handling by the user. It will be obvious that if a plaster be of such a nature that its setting time is subject to erratic behavior on the job, it will be non-competitive against plaster which can be depended upon to exhibit definite, predetermined and reliable setting characteristics.

For carrying the present invention into effect, to calcined gypsum plaster (calcium sulfate hemihydrate) there are added a certain amount of calcium sulfate dihydrate seed crystals and a corresponding amount of retarder, the latter being a substance well known in the industry and generally consisting of keratinaceous material which has been treated with caustic soda and quicklime. This is a nitrogenous product which, because of its colloidal properties, has a retarding effect upon the setting time of the calcined gypsum. Other retarders may be used, such as powdered glue, citrates, acetates, timothy hay extract, etc. In accordance with the present invention, in addition to the seed crystals already mentioned, there is also used a small quantity of a material which has the faculty of preventing the loss of the water of crystallization of the calcium sulfate dihydrate seed crystals. A large number of substances are suitable for this purpose, and they may be exemplified by the general group of water-soluble carbohydrates known as sugar, although materials intermediate between starch and sugar —such as the more soluble dextrins, as for example British gum—will also be operative for the present purpose. Other materials which have been found to be efficacious for the prevention of loss of water of hydration from the seed crystals are polyhydric alcohols such as glycerol, glycol and the polyglycols. Because of its ready availability and low price, ordinary dextrose or glucose, particularly in the commercial form known as corn sugar, has been found to be the most advantageous.

Figure 2:
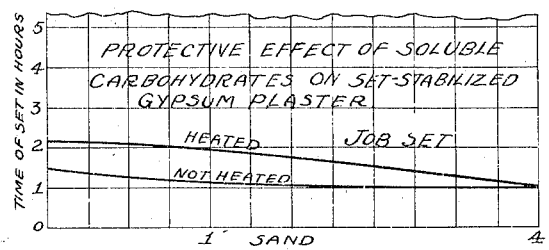

For a better understanding of the present invention there are submitted herewith, in the form of drawing, two graphs, Fig. 1 illustrating the effect of heat upon a set-stabilized plaster in which an unprotected seeding agent has been used, and Fig. 2 illustrating the effect of the soluble carbohydrates as dehydration preventing material.

As an illustration of one, preferred, formula for a plaster embodying the concept of the present invention, there may be combined the following:

| | Pounds |
|---|---|
| Calcined gypsum stucco (calcium sulfate hemihydrate) | 2,000 |
| An accelerating agent, which itself is compounded in the proportions of 100 pounds of calcium sulfate dihydrate crystals in finely divided form and 5 to 25 pounds of corn sugar | 20 |
| Commercial retarder | 8 |

The above formula, however, is given merely as an exemplification of the present invention and is not to be considered in any way as a limitation thereof. It should be understood that it is desirable to treat the set-stabilizing seeding agent with corn sugar, or the above mentioned equivalents thereof, before it is admixed with the calcined gypsum and retarder. It is highly desirable that the dehydration-preventing substance, such as the corn sugar or its equivalent, be in such close proximity to the seed crystals as to insure the protection thereof against loss of water of hydration if these crystals should from any source become heated. As a further consideration it may also be mentioned that the incorporation of the corn sugar with the seed crystals can be most economically and advantageously carried out from a commercial viewpoint by incorporating the protecting agent with the seed crystals as a separate operation. For example, the seeding material may be thoroughly mixed therewith in the form of an aqueous solution, if necessary, or directly in case glycerol or glycol be used, whereafter the latter is dried to remove the added solvent, such as water. If the material is soluble in an orginic liquid such as alcohol or ether, such a substance may be used as a diluent or solvent and then allowed to evaporate. One way of accomplishing this result is to take the seed crystal material and, while in powdered condition, spray it with a solution or dispersion of the protective agent either previously to or coincidentally with the grinding or mixing thereof. Alternatively, corn sugar may be intimately ground, as for example in a ball mill or the like, with the set-stabilizing calcium sulfate dihydrate crystal material. As a further alternative, calcined gypsum may be gaged or mixed with a solution of corn sugar or other protective agent and allowed to set into a hard mass, thus forming calcium sulfate dihydrate crystals, after which the set mass may be comminuted and ground to the desired fineness.

In the most advantageous form, the seed crystals should be coated with the protective agent, and therefore any mechanical or chemical means by which such coating can be accomplished is to be considered as within the scope and intent of the present inventive concept. For example, a solution of corn sugar, in the proportion of 5 to 25 pounds thereof, may be sprayed into 100 pounds of calcium sulfate dihydrate in powdered form while the latter is being vigorously agitated in a Broughton mixer until the solvent (water) has evaporated, thus leaving the sugar attached to or interspersed with the calcium sulfate dihydrate crystals.

When using materials other than corn sugar, it is preferable to use the equivalent quantities of the other substances. Among the sugars, other than corn sugar, it may be mentioned that any carbohydrate having a sweetish taste and of the general formula $C_nH_{2n}O_n$ or $C_nH_{2n-2}O_{n-1}$ may be employed. In general, hexose sugars of the general formula $C_6H_{12}O_6$ are more efficient. However, the invention is not to be confined to these particular sugars, since it has been found that other sugars, such as maltose, lactose, sucrose, and similar saccharine products, may be employed in lieu thereof. Thus, for example, molasses also exhibits a protective property, although it is not as efficient as the pure sugar. On the other hand, a thoroughly dextrinized starch, such for example as British gum, may be used; and, as already mentioned, glycerol or glycols may be employed in the manner above indicated.

In order to demonstrate the protective effect of the protecting agent and the effect of heat upon various types of plasters which have been made with seeding agents that have been protected as well as with seeding agents that have not been protected, the following experiments were made, yielding the results set forth immediately hereinbelow. Two batches of material were prepared as follows:

|  | A | B |  |
| --- | --- | --- | --- |
|  | Pounds | Pounds |  |
| Calcium sulfate hemihydrate (calcined gypsum) | 2000 | 2000 |  |
| Calcium sulfate dihydrate seeding agent | 20 | 18 | premixed in ball mill |
| Corn sugar | | 2 | |
| Retarder | 8 | 8 | |

The two mixtures, A and B, as above made, were then tested for job set as well for laboratory set, both in the neat condition and in admixture with sand in the proportions of 1:1 and 1:4. By job set is meant the time of set required in the commercial application of the material, while the laboratory or clean set is the setting time of the material when mixed in scrupulously clean laboratory utensils and spread out on clean glass plates under such conditions as are generally found in the well conducted chemical laboratory. The setting time in the laboratory is invariably slower than on the job because under commercial conditions there are always present dust, dirt and other materials which hasten the set, this also probably being somewhat influenced by the size of the batches made up. As shown in Table I hereinbelow, tests were made both with material which had been subjected to heat, at a temperature of about 250° F., and material which was not heated at all but had been mixed at ordinary room temperature of about 70° F. It will be noted that formula A did not contain the dehydration-preventing protective agent. The results were as follows:

TABLE I

FORMULA A

*Unprotected seeding agent*

|  | Subjected to heat | | | Not heated | | |
| --- | --- | --- | --- | --- | --- | --- |
|  | Neat | 1:1 Sand | 1:4 Sand | Neat | 1:1 Sand | 1:4 Sand |
| Job set (hrs.) | 16:00 | 6:20 | 2:20 | 1:00 | 1:00 | 0:50 |
| Lab. set (hrs.) | 30:00 | 22:00 | 14:00 | 1:00 | 1:00 | 0:55 |

TABLE II

FORMULA B

*Seeding agent protected with corn sugar*

|  | Subjected to heat | | | Not heated | | |
| --- | --- | --- | --- | --- | --- | --- |
|  | Neat | 1:1 Sand | 1:4 Sand | Neat | 1:1 Sand | 1:4 Sand |
| Job set (hrs.) | 2:10 | 2:00 | 0:55 | 1:30 | 1:05 | 1:00 |
| Lab. set (hrs.) | 1:50 | 1:35 | 0:55 | 2:00 | 1:50 | 1:20 |

The results of these tables were plotted in the drawing, Fig. 1 showing the effect of heat upon the unprotected seeding agent so far as it affects the setting time of the plaster made therewith, both when it has been subsequently heated and when it has not been heated. Thus in Fig. 1 the time of job set of the heated material unmixed with sand (neat) is as much as 16 hours, this dropping to 6 hours and 20 minutes with an equal part of sand, and to as low as 2 hours and 20 minutes with 4 parts of sand. This clearly demonstrates that the seeding and accelerating effect of the added calcium sulfate dihydrate seeding material has been virtually destroyed by the heat so that the seeding and accelerating effect of the sand itself comes into prominence. It also demonstrates that the amount of retarder, because of the destruction of the seeding agent, has become highly effective, so that the length of time of the set is unreasonably extended, as for example to as much as 16 hours. The very same material, however, when not subjected to heat, will set under job conditions in one hour, in one hour when mixed with an equal part of sand, and in 50 minutes when mixed with four parts of sand. As seen in Fig. 1, the heated material yields an extremely steep curve, while the unheated material yields practically a straight line. In other words, the heat has destroyed the effect of the added seeding agent. In the laboratory set, which has not been plotted on the graphs, it will be seen from the tables that the material which has been heated, and while neat requires 30 hours to set, takes 22 hours to set when mixed with an equal part of sand and 14 hours when mixed with 4 parts of sand. Under the same laboratory conditions but using the material which has not been heated, the setting time is almost exactly the same as under job conditions, namely, one hour neat, one hour when mixed with an equal part of sand, and 55 minutes when mixed with 4 parts of sand. There thus can be no doubt that the heat has destroyed whatever seeding properties the added dihydrate material originally possessed.

Referring to Fig. 2, this clearly exhibits the remarkable stabilizing effect of a seeding agent which has been protected by a dehydration preventing agent. The job set has been chosen for illustrative purposes because it best exemplifies the commercial effectiveness of the invention. As will be seen from this figure as well as from Table II, there is very little difference between the heated and unheated material; for example, the material which has not been heated shows a setting time, neat, of 1 hour and 30 minutes; with 1 part of sand, 1 hour and 5 minutes; and with 4 parts of sand, 1 hour. If this material is heated to about 250 F., it still retains substantially the proper setting qualities, for then it will set on the job, neat, in 2 hours and 10 minutes; when mixed with 1 part of sand, in 2 hours; and with 4 parts of sand, in 55 minutes. As seen in Fig. 2, the final setting time, when mixed with 4 parts of sand, differs by only 5 minutes as between the heated and unheated materials, this being a clear demonstration of the remarkable efficacy of the protected material.

For optimum results, it is preferred to use about 2 pounds of corn sugar per ton of plaster, but the quantity may be varied to as little as ¼ pound and may be as high as 60 pounds. However, when the upper range of corn sugar is used, certain somewhat undesirable influences upon the working qualities of the finished gypsum plaster become manifest, which would probably somewhat lessen its general acceptance by the industry.

The essence of the invention therefore lies in the production of a set-stabilized calcium sulfate hemihydrate cement or plaster which contains seed crystals of calcium sulfate dihydrate protected against loss of their water of hydration as a result of heating, and an equivalent amount of retarder, so as to produce a plaster the setting time of which is not subject to change on storage in the presence of heat or upon the adventitious admixture of accelerating or retarding influences, and for such a plaster the inventor claims:

1. A set-stabilized calcium sulfate hemihydrate plaster comprising calcium sulfate hemihydrate and a set-stabilizing compound which comprises retarder, calcium sulfate dihydrate and a dehydration-preventing substance from the group consisting of sugars, dextrins and polyhydroxy alcohols.

2. A set-stabilized calcium sulfate hemihydrate plaster comprising calcium sulfate hemihydrate, retarder, seed crystals of calcium sulfate dihydrate, and a soluble carbohydrate protecting the latter against loss of its water of crystallizatiion.

3. A set-stabilized calcium sulfate hemihydrate plaster comprising calcium sulfate hemihydrate, retarder, seed crystals of calcium sulfate dihydrate, and a sugar protecting the latter against loss of its water of crystallization.

4. A set-stabilized calcium sulfate hemihydrate plaster comprising calcium sulfate hemihydrate, retarder, seed crystals of calcium sulfate dihydrate, and a dextrin protecting the latter against loss of its water of crystallization.

5. A set-stabilized calcium sulfate hemihydrate plaster comprising calcium sulfate hemihydrate, retarder seed crystals of calcium sulfate dihydrate, and a polyhydroxy alcohol protecting the latter against loss of its water of crystallization.

6. A set-stabilized calcium sulfate hemihydrate plaster comprising calcium sulfate hemihydrate and a set-stabilizing compound which comprises retarder, calcium sulfate dihydrate and a hexose sugar.

7. A set-stabilized calcium sulfate hemihydrate plaster comprising calcium sulfate hemihydrate and a set-stabilizing compound which comprises retarder, calcium sulfate dihydrate and corn sugar.

8. A set-stabilized calcium sulfate hemihydrate plaster comprising calcium sulfate hemihydrate and a set-stabilizing compound which comprises retarder, calcium sulfate and glycerol.

9. The process of producing a set-stabilized calcined gypsum plaster which comprises mixing therewith retarder and a calcium sulfate dihydrate crystal-forming seeding agent protected against loss of water of crystallization by admixing the dihydrate with a substance selected from the group consisting of sugars, dextrins and polyhydroxy alcohols.

10. The process of protecting the calcium sulfate crystal-forming ingredient of set-stabilized calcined gypsum plaster against loss of water of crystallization on heating which comprises coating the said ingredient with a hexose sugar.

11. The process of protecting seed-crystal-containing set-stabilized calcined gypsum plaster against deterioration by heat which comprises adding thereto during its manufacture a substance from the group consisting of sugars, dextrins and polyhydroxy alcohols.

12. A set-stabilized plaster comprising calcined gypsum, retarder, and sugar-coated calcium sulfate dihydrate particles.

13. A set-stabilized plaster comprising about 2000 parts of calcined gypsum, about 20 parts of a composition consisting of calcium sulfate dihydrate and sugar in the proportions of about 100 of the former to from about 5 to 25 of the latter, and about 8 pounds of commercial retarder.

14. A set-stabilized calcium sulfate hemihydrate plaster comprising calcium sulfate hemihydrate, retarder, seed crystals of calcium sulfate dihydrate, and an organic water-soluble, relatively non-volatile, hygroscopic material coating said dihydrate and protecting the same against loss of its water of crystallization.

15. A set-stabilized calcium sulfate hemihydrate plaster comprising calcium sulfate hemihydrate, retarder, seed crystals of calcium sulfate dihydrate, and a water-soluble, relatively non-volatile, polyhydroxy alcoholic material coating said dihydrate and protecting the same against loss of its water of crystallization.

GEORGE D. KING.